April 4, 1939.  G. O. CONNER  2,153,365
MANUFACTURE OF CONTAINERS
Filed Dec. 18, 1934  5 Sheets-Sheet 1
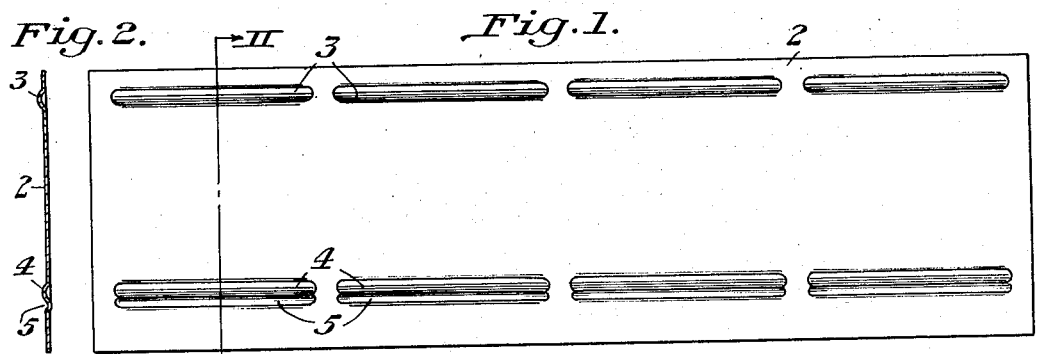
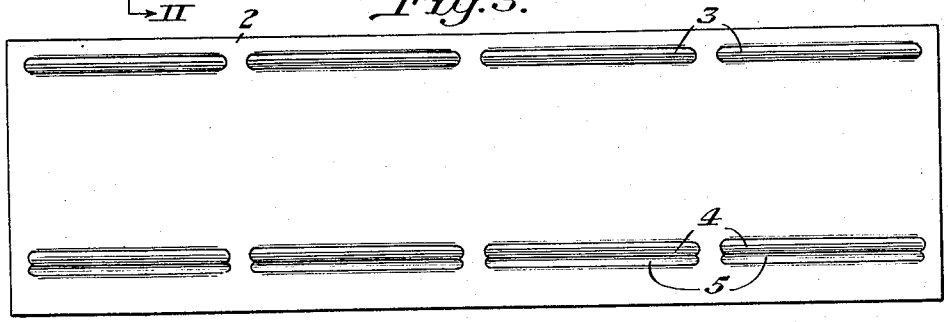
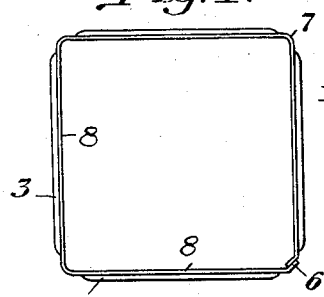
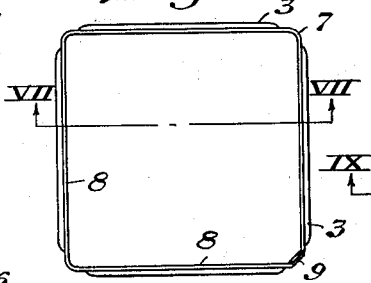
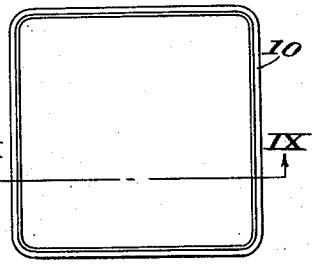
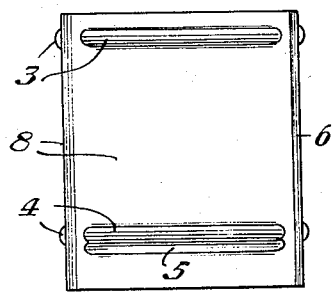
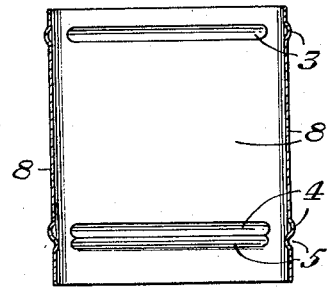
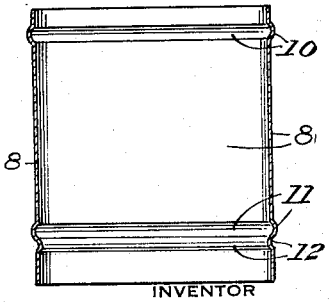
INVENTOR

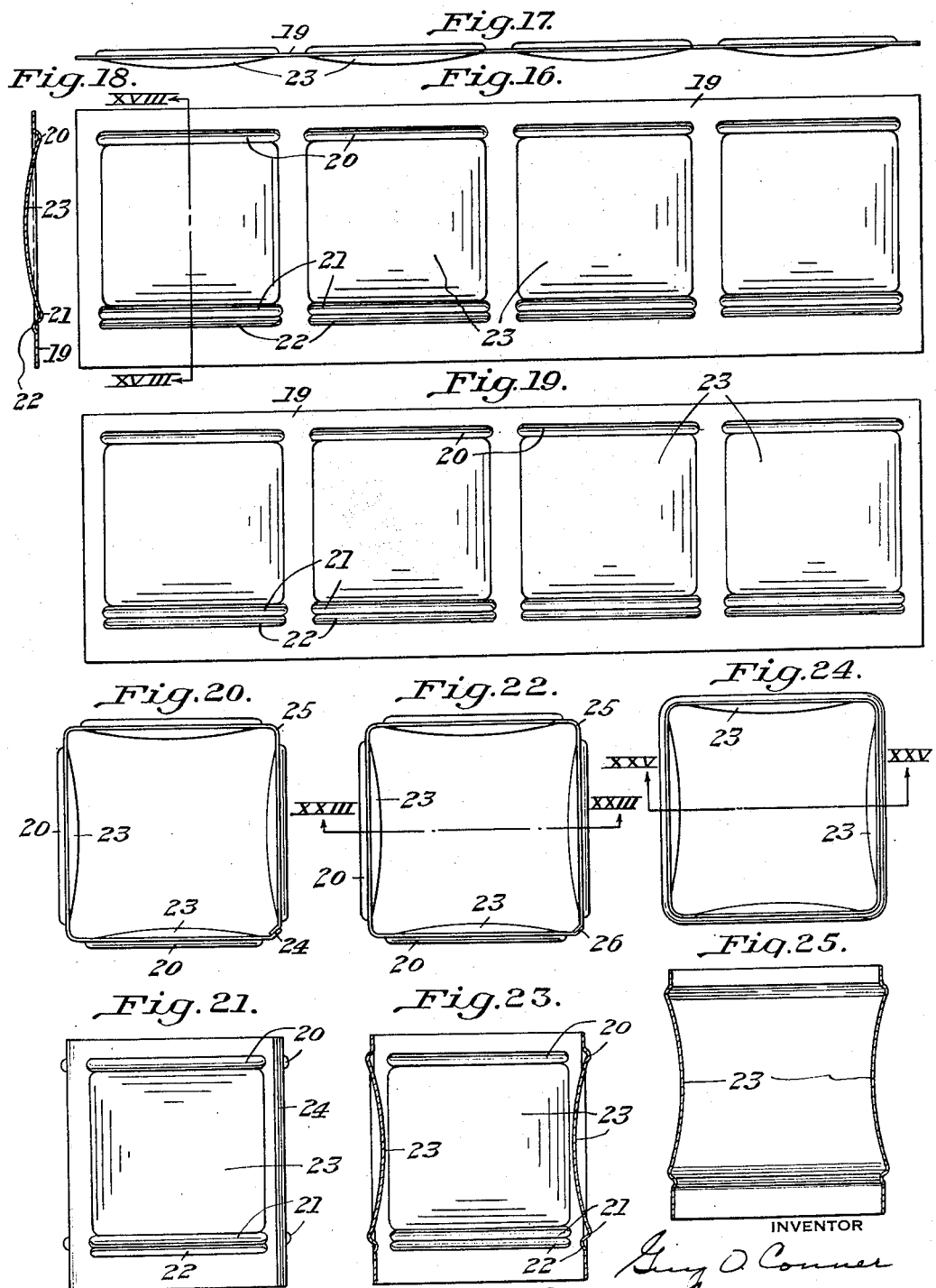

INVENTOR
Guy O. Conner
by Byrnes, Stebbins & Davis
his attorney

April 4, 1939.  G. O. CONNER  2,153,365
MANUFACTURE OF CONTAINERS
Filed Dec. 18, 1934  5 Sheets-Sheet 5

INVENTOR

Patented Apr. 4, 1939

2,153,365

UNITED STATES PATENT OFFICE 2,153,365

MANUFACTURE OF CONTAINERS

Guy O. Conner, Wheeling, W. Va., assignor to Wheeling Steel Corporation, Wheeling, W. Va., a corporation of Delaware Application December 18, 1934, Serial No. 758,034

8 Claims. (Cl. 113—120)

This invention relates broadly to the manufacture of containers. It relates more particularly to the manufacture of sheet metal containers, and especially containers of the type adapted for the storage, transportation and dispensing of fluids. The invention further relates to certain improved steps in the manufacture of containers of the type mentioned, resulting in materially decreased manufacturing cost by reason of the fact that relatively simple and inexpensive machinery may be used. Also, a container of exceptional quality and strength is produced.

This invention in one of its aspects has to do with the manufacture of containers of the character disclosed and claimed in my copending Patent No. 2,114,137. While the methods of manufacture disclosed and claimed in said copending application are under most circumstances preferred, in some cases it is desirable to strive mainly for low cost production and particularly the elimination of expensive drawing dies of the type used for simultaneously drawing as a whole preformed container bodies. I provide for the formation of containers of the general character disclosed and claimed in my said copending application at considerably reduced cost and without the necessity of the use of dies of the type disclosed in said application.

I manufacture a container of the type mentioned by providing a substantially flat blank and preferably bending such blank at spaced portions to form at least a portion of a generally polygonal container body member, thereafter connecting together blank edges to form such body member and thereafter deforming the body member. I prefer under most circumstances to die-form the blank while in substantially flat condition and thereafter utilize the thus die-formed blank in the manufacture of a container body member.

The die-forming of the substantially flat blank can be effected with a relatively cheap and simple die, after which the thus die-formed blank can be further deformed or bent to form or partially form a container or container body member. After such formation the blank may be further deformed, especially at the corner edge portions. It is desirable when initially die-forming the substantially flat blank to leave portions unformed for bending or other deformation to convert the substantially flat blank into a closed or partially closed container or container body member, and thereafter to further die-form the corner edge portions intermediate the previously die-formed portions in such manner, for example, as to form a continuous reinforcing portion around the body. If such reinforcing portion should be die-formed as a whole in the substantially flat blank before bending or otherwise deforming such blank as above mentioned, the second mentioned step would be rendered relatively difficult or impossible as, for example, it might be necessary to bend the blank transversely of a previously die-formed rib. Thus, my preferred sequence of operations is of particular advantage in the production of reinforced containers.

My improved method is of particular advantage in the formation of bowed containers, and especially those having bowed sides and bowed corner edge portions, such as shown, for example, in Figure 1 of the drawings of my said copending application. I can die-form in the original flat blank portions of the reinforcing ribs, and I can also, and preferably at the same time, further die-form or draw the side wall portions intermediate the portions where the corners are to be, these last mentioned portions being left substantially unformed to permit of bending or otherwise deforming the blank into generally its ultimate shape. After the blank has been bent or deformed into generally its ultimate shape I can further deform the corner edge portions thereof to continue the reinforcing ribs around the corners and to connect the drawn or bowed side wall portions by bowed corner edge portions.

Without the original die-forming in the flat blank the method just described would be difficult or impossible of attainment unless a die of the general type disclosed in my said copending application were used. However, due to the preliminary die-forming of the substantially flat blank, I am able to use a relatively cheap and simple die for forming the corner edge portions. I preferably form these corner edge portions successively in the same die, turning the blank relative to the die between operations. Thus I am enabled to produce substantially the same container as is disclosed and claimed in my said copending application but at a considerably lower cost and with machinery costing only a fraction of the cost of the relatively complicated and expensive machinery disclosed in said application.

Other details, objects and advantages of the invention will become apparent as the following description of certain present preferred embodiments thereof and certain present preferred methods of practicing the same proceeds.

In the accompanying drawings I have shown certain present preferred embodiments of the invention, in which Figure 1 is a plan view of a substantially flat die-formed blank;

Figure 2 is a cross-sectional view taken on the line II—II of Figure 1;

Figure 3 is a plan view similar to Figure 1 of the blank after trimming;

Figure 4 is a top plan view of the blank after formation into the shape of a container body;

Figure 5 is an elevational view of the blank shown in Figure 4;

Figure 6 is a plan view similar to Figure 4 but with the edges of the blank welded together;

Figure 7 is a vertical cross-sectional view, taken on the line VII—VII of Figure 6;

Figure 8 is a plan view of the blank with strengthening portions formed in the corners joining the preformed strengthening ribs;

Figure 9 is a vertical cross-sectional view, taken on the line IX—IX of Figure 8;

Figure 16 is a plan view similar to Figure 1 of a modified form of die-formed blank;

Figure 17 is a longitudinal edge view of the blank shown in Figure 16;

Figure 32:
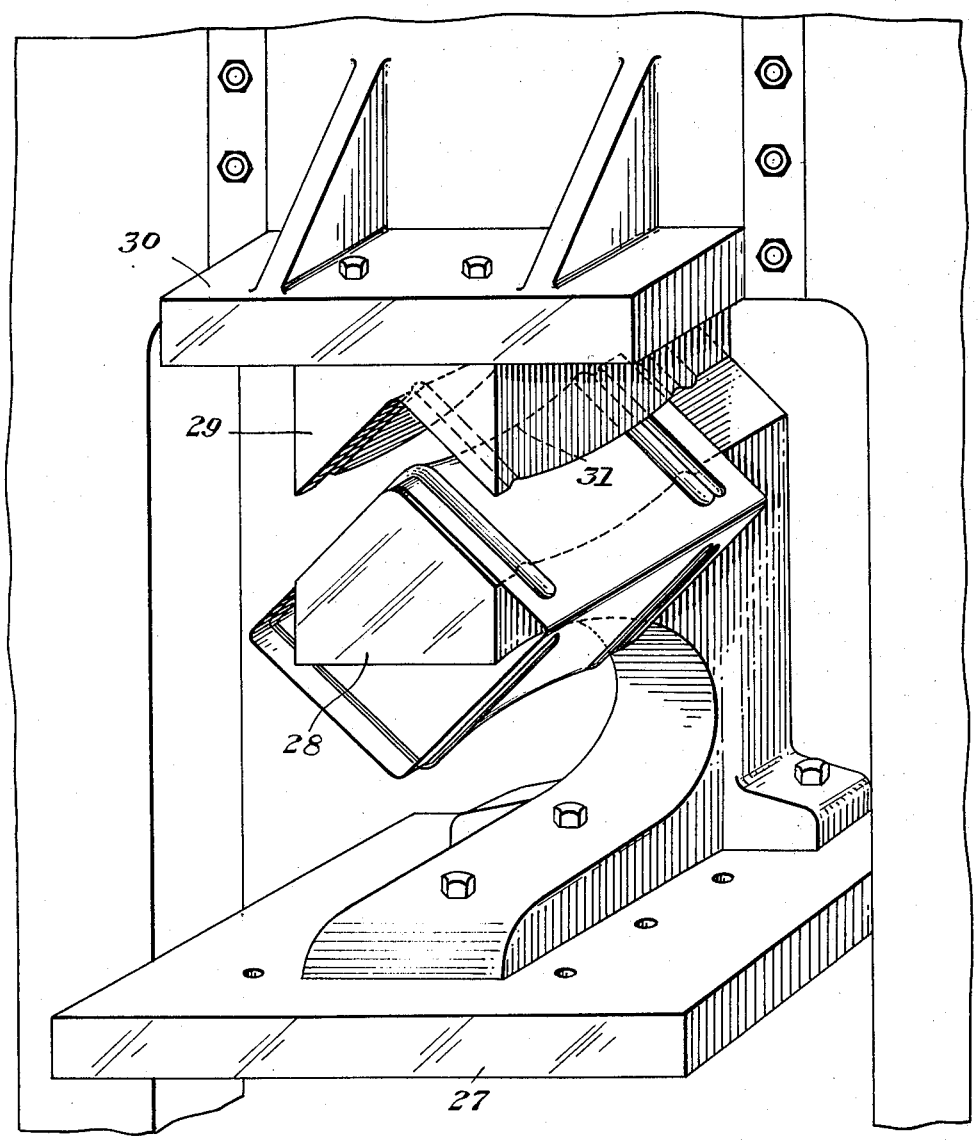

Figures 18 to 31, inclusive, are views corresponding, respectively, to Figures 2 to 15, inclusive, but showing the steps of forming a container out of the modified form of blank shown in Figure 16; and Figure 32 is a perspective view of a corner die showing one of the operations which form the transition from Figures 22 and 23 to Figures 24 and 25.

Purely for the purpose of explanation and illustration the manufacture of two containers will now be described in detail. The first of these containers is one having substantially flat side walls and substantially straight corner edge portions and the second is one having bowed side walls and bowed corner edge portions. The steps in the manufacture of the first container are shown in Figures 1 to 15, inclusive, and the steps in the manufacture of the second container are shown in Figures 16 to 32, inclusive.

Referring now more particularly to Figures 1 to 15, inclusive, there is shown in Figures 1 and 2 a substantially flat blank 2 of generally rectangular shape in which there are die-formed or impressed four sets of segregated longitudinally extending parallel strengthening ribs. Each set comprises an upper outwardly pressed rib 3, a lower outwardly pressed rib 4 and, below the rib 4, an inwardly pressed rib 5 which is preferably contiguous to the rib 4. The respective sets of strengthening ribs are so positioned on the blank that when the blank is bent or deformed into generally its ultimate shape each set of ribs will be substantially centered with respect to a side wall or face of the bent blank.

The same blank is shown in Figure 3 but after having been accurately trimmed so that it is ready to be deformed into generally the shape of a container body blank. The blank is bent intermediate the respective sets of strengthening ribs, the bending in each case being about an edge which is slightly radiused so that the corner edge portions of the blank will not be sharply broken. The body blank as thus formed is shown in Figures 4 and 5, such blank assuming generally the shape of a right parallelopiped and with the strengthening ribs parallel to the upper and lower edges of the respective side walls or panels. The longitudinal edges of the body blank are overlapped as shown at 6. The corner edge portions 7, including the edge portion 6, are substantially straight and the side walls 8 are substantially flat. The strengthening ribs extend only within the flat side walls and stop short of the slightly radiused corner edge portions.

The next step consists in joining or connecting together the edge portions of the blank, this preferably being done by welding, as at 9 in Figure 6. This forms a straight welded seam at one of the corner edge portions of the body blank. The edges may be crimped together if desired either with or without welding or soldering. Aside from the connecting together of the edges of the body blank, it is the same in Figures 6 and 7 as in Figures 4 and 5.

The next operation is one of the key operations of the process. The body blank as shown in Figures 6 and 7 is placed in a corner die similar to that shown in Figure 32, but as the particular form of corner die shown in said figure is adapted for use in the formation of a bowed container, the specific description of the die will be deferred until its proper place. However, the corner die used in the formation of the flat sided container is of exactly the same type as that shown in Figure 32. One of the corner edge portions of the blank as shown in Figures 6 and 7 is placed over the anvil and the die descends thereagainst, cooperating with the anvil to die-form such corner edge portion. The corner radius is slightly increased and the strengthening ribs 3, 4 and 5 are joined by corresponding rib portions which extend around the corner of the blank so that the blank after having had all four corners acted on by the corner die assumes the shape shown in Figures 8 and 9. The strengthening ribs 3 have become a continuous outward strengthening bead or depression 10, the ribs 4 have become a continuous outward bead or depression 11 and the ribs 5 have become a continuous inward bead 12 contiguous to the bead 11. Thus there is formed in an extremely simple manner and by the use of equipment of low cost a reinforced container body blank of generally polygonal shape and with continuous strengthening beads extending therearound.

Figure 10:
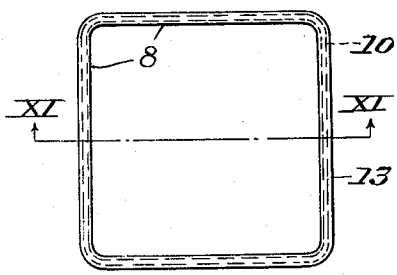
Figure 10 is a top plan view of the blank with the top and bottom flanged to receive the top and bottom closures.
Figure 11:
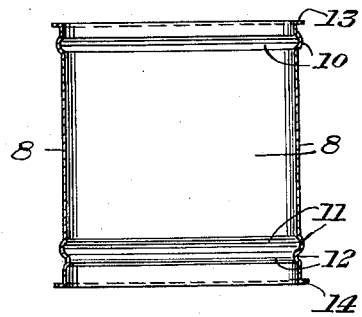
Figure 11 is a vertical cross-sectional view, taken on the line XI—XI of Figure 10.

The next step is the flanging of the top and bottom of the body blank to receive the top and bottom closure members. The thus flanged blank is shown in Figures 10 and 11, the upper flange being indicated at 13 and the lower flange at 14. In the form shown both of these flanges extend outwardly.

Figure 12:
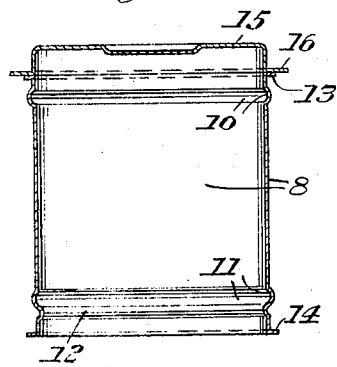
Figure 12 is a vertical cross-sectional view of the blank as shown in Figure 11 with the top closure set in place thereon.
Figure 13:
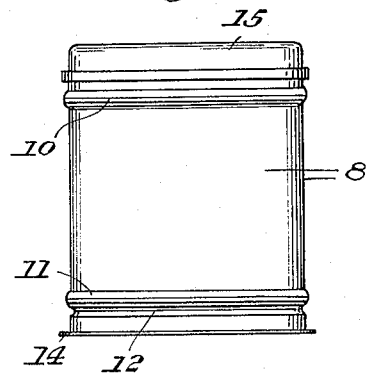
Figure 13 is an elevational view of the blank with the top closure seamed thereto.

The top closure member 15 is then superimposed upon the flanged body blank as shown in Figure 12. The top closure member is of generally dome shape and has a peripheral flange 16 adapted to lie upon the flange 13 and to be deformed or interseamed therewith as shown in Figure 13. As the present invention does not have to do with the specific form or shape of the closure members, both the top closure member and the bottom closure member are shown as being substantially plain, although the top closure member is preferably spouted. Likewise, a handle for carrying the container may be provided substantialy centrally of the top closure member, but as this forms no part of the present invention it is not specifically shown.

Figure 14:
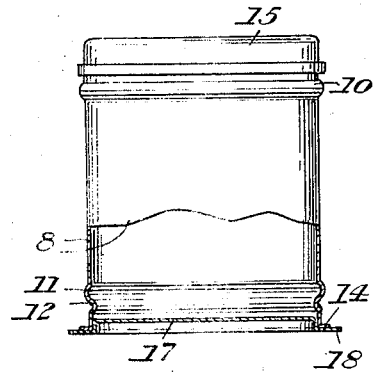
Figure 14 is an elevational view, partly in vertical cross section, of the blank assembled with the bottom closure.
Figure 15:
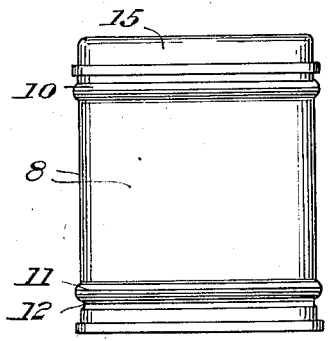
Figure 15 is an elevational view of a finished container, that is to say, the blank as shown in Figure 14 with the bottom closure seamed thereto.
Figure 26:
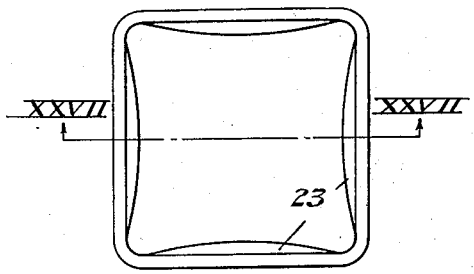
Figure 27:
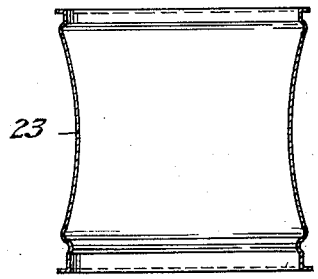
Figure 28:
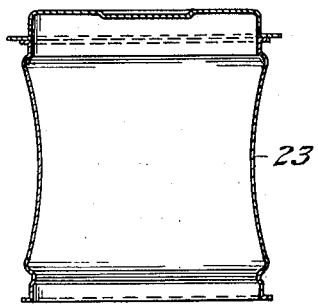
Figure 29:
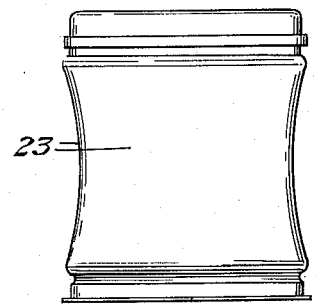
Figure 30:
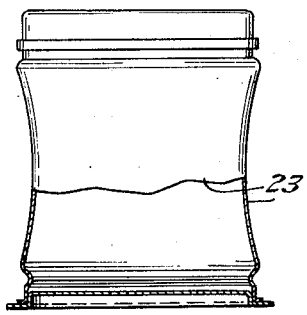
Figure 31:
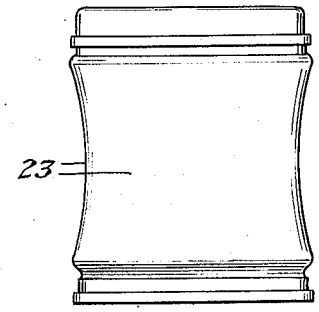

The body blank with the top closure member seamed thereto is then superimposed upon a bottom closure member 17 as shown in Figure 14. The bottom closure member 17 has a flange 18 adapted to be interseamed with the flange 14 of the body blank to form a finished container as shown in Figure 15.

The form of construction shown in Figures 16 to 32, inclusive, is generally analogous to that of Figures 1 to 15, inclusive, except for the shape of the side walls and corner edge portions of the body blank. The original substantially flat rectangular blank which has been die-formed in the flat is shown in Figures 16, 17 and 18. This blank is designated by reference numeral 19 and comprises sets of strengthening ribs 20, 21 and 22 analogous, respectively, to the sets comprising the strengthening ribs 3, 4 and 5 shown in Figure 1. The blank is, however, otherwise deformed, as shown at 23, such deformation preferably being in the nature of segregated bowed portions extending in the direction of the height of the blank. The bow merges at its top with the rib 20 and at its bottom with the rib 21 and terminates laterally at points slightly spaced from the portions at which the blank is adapted to be bent. A substantially flat blank is thus provided which has side wall portions which are not only provided with the strengthening ribs as in the form previously described but which are also preliminarily bowed as just described, although in order to permit of bending of the blank into generally its ultimate shape the bowed portions are confined intermediate the portions at which the bending is to occur so that such latter mentioned portions remain substantially flat and plane. The bowed portion 23 extends generally inwardly of the body blank and very materially cooperates with the strengthening ribs to reinforce and strengthen the body even though in the formation of the bowed portions the metal may be somewhat drawn or thinned.

The closed body blank formed upon bending of the substantially flat blank intermediate the die-formed portions is shown in Figures 20 and 21, the longitudinal edges of the blank being overlapped as shown at 24 and the corner edge portions 25 of the blank being substantially straight. The closed body blank as shown in Figures 20 and 21 is the same as that shown in Figures 4 and 5 except for the bowed side wall portions.

Figures 22 and 23 correspond, respectively, to Figures 6 and 7 and show the blank with the edges welded together at 26. The blank is then operated on by the corner die shown in Figure 32. This die comprises a base 27 upon which is mounted an anvil 28 with which cooperates a vertically reciprocable die 29 carried by a holder 30. The die and the anvil are of complementary shape, having portions for extending the strengthening ribs around the corners of the blank as shown and the ridge of the anvil and the crotch of the die being downwardly curved as shown at 31 and the anvil and die surfaces merging smoothly with the ridge or crotch so that each corner portion of the blank is further deformed so as to be inwardly bowed and to merge gracefully with the inwardly bowed side wall portions. The corner radius is also slightly increased by the die.

As with the form of blank first described, the blank is turned upon the mandrel between die-forming operations until the die has acted upon each corner. This produces a body blank as desired with inwardly bowed side walls and inwardly bowed corners presenting an extremely attractive appearance and being at the same time of exceptional structural strength. The use of a complicated die adapted to operate simultaneously upon the body blank as a whole is entirely avoided and the cost of manufacture and the outlay for equipment are thus kept at a minimum. The blank after the corner die operation is shown in Figures 24 and 25.

Figures 26 to 31, inclusive, are exactly analogous to Figures 10 to 15, inclusive, these figures showing the flanging of the blank and the application and connection thereto of the top and bottom closure members. In view of the above detailed description of Figures 10 to 15, inclusive, no further description of Figures 26 to 31, inclusive, is necessary.

While I have shown and described certain present preferred embodiments of the invention and certain present preferred methods of practicing the same, it is to be distinctly understood that the same is not limited thereto but may be otherwise variously embodied and practiced within the scope of the following claims.

I claim:

1. A method of making a container, comprising providing a substantially flat blank, die-forming said blank while in substantially flat condition to bow the same, bending said blank to form at least a portion of a generally polygonal container body member with at least one substantially straight corner edge portion, and thereafter bowing said corner edge portion.

2. A method of making a container, comprising providing a substantially flat blank, die-forming said blank at spaced portions thereof while in substantially flat condition to provide strengthening portions therein and to bow the same, bending said blank intermediate said portions to form at least a portion of a generally polygonal container body member with at least one substantially straight corner edge portion, and thereafter deforming said corner edge portion in such manner as to provide deformed portions connecting said strengthening portions and to bow said corner edge portion.

3. A method of making a container, comprising providing a blank, forming reinforcements in said blank at spaced portions thereof, thereafter bending said blank intermediate said reinforcements into the shape of at least a portion of a container, and thereafter forming in the bent portion of said blank intermediate said reinforcements an additional reinforcement connecting said first mentioned reinforcements, whereby to reinforce the container continuously through said bent portion.

4. A method of making a container, comprising providing a blank, forming reinforcements in said blank at spaced portions thereof, thereafter bending said blank into the shape of at least a portion of a container and so as to dispose said reinforcements at several faces of the container, and thereafter forming in the blank at an unreinforced portion thereof intermediate said reinforcements an additional reinforcement connecting said first mentioned reinforcements so as to make out of said first mentioned and second mentioned reinforcements in effect a single continuous reinforcement.

5. A method of making a container, comprising providing a blank having reinforcements disposed in generally aligned relationship generally parallel to an edge of the blank and spaced apart, thereafter bending said blank intermediate said reinforcements into the shape of at least a portion of a container with the reinforcements disposed at several faces of the container and arranged generally parallel to a rim thereof, and thereafter forming in the bent portion of said blank intermediate said reinforcements an additional reinforcement connecting said first mentioned reinforcements, whereby to reinforce the container continuously through said bent portion.

6. A method of making a container, comprising providing a blank adapted to form a peripherally closed portion of the container and having reinforcements disposed in generally aligned relationship generally parallel to an edge of the blank and spaced apart, thereafter bending said blank intermediate the reinforcements of each adjacent pair thereof into the shape of a peripherally closed portion of the container with the reinforcements disposed at the several faces thereof and arranged generally parallel to a rim thereof, and thereafter forming in the bent portions of the blank intermediate said reinforcements additional reinforcements connecting said first mentioned reinforcements, whereby to reinforce the container continuously throughout its periphery.

7. A method of making a container, comprising providing a blank, deforming the material of said blank at spaced portions thereof, thereafter bending said blank intermediate said portions into the shape of at least a part of a container, and thereafter forming in the bent portion of said blank intermediate said first mentioned portions an additional deformed portion connecting said first mentioned portions, whereby to deform the container continuously through said bent portion.

8. A method of making a container, comprising providing a blank, die-forming the material of said blank at spaced portions thereof into generally bowed cross section, thereafter bending said blank intermediate said portions into the shape of at least a part of a container, and thereafter die-forming in the bent portion of said blank intermediate said first mentioned portions an additional bowed portion connecting said first mentioned portions, whereby to bow the container continuously through said bent portion.

GUY O. CONNER.